(12) United States Patent
Tanaka et al.

(10) Patent No.: US 11,299,082 B2
(45) Date of Patent: Apr. 12, 2022

(54) DUMP BODY AND DUMP TRUCK

(71) Applicant: Komatsu Ltd., Tokyo (JP)

(72) Inventors: Yushi Tanaka, Tokyo (JP); Kengo Aoki, Tokyo (JP)

(73) Assignee: Komatsu Ltd., Tokyo (JP)

(*) Notice: Subject to any disclaimer, the term of this patent is extended or adjusted under 35 U.S.C. 154(b) by 693 days.

(21) Appl. No.: 16/301,848

(22) PCT Filed: Jul. 10, 2018

(86) PCT No.: PCT/JP2018/026053
§ 371 (c)(1),
(2) Date: Nov. 15, 2018

(87) PCT Pub. No.: WO2018/216824
PCT Pub. Date: Nov. 29, 2018

(65) Prior Publication Data
US 2021/0221274 A1 Jul. 22, 2021

(51) Int. Cl.
*B60P 1/28* (2006.01)
*B60K 13/04* (2006.01)

(52) U.S. Cl.
CPC .............. *B60P 1/283* (2013.01); *B60K 13/04* (2013.01); *B60Y 2200/142* (2013.01)

(58) Field of Classification Search
CPC .. B60P 1/28; B60P 1/283; B60P 1/286; B60P 1/16; B60P 1/04; B60P 1/26; B60P 3/423; B60P 1/045; B60P 1/02; B60P 1/4407
USPC ...... 298/17 R, 22 R, 17.5, 2, 11, 17.8, 17 B, 298/22 P, 18, 19 R, 23 TT, 1 A
See application file for complete search history.

(56) References Cited

U.S. PATENT DOCUMENTS

| | | | | |
|---|---|---|---|---|
| 3,331,433 A | * | 7/1967 | Hagberg | ............ B60H 1/00014 165/51 |
| 6,113,193 A | * | 9/2000 | Kunzeman | .............. B60P 1/283 123/357 |
| 7,320,504 B2 | * | 1/2008 | Colling | .................... B60P 1/286 298/1 H |
| 8,721,006 B2 | * | 5/2014 | Uranaka | .................. B60P 1/286 298/17 R |
| 2009/0152934 A1 | * | 6/2009 | Devries | .................... B60P 1/283 298/1 H |

FOREIGN PATENT DOCUMENTS

| | | |
|---|---|---|
| JP | 56-000327 U1 | 1/1981 |
| JP | 1-76511 U | 5/1989 |

(Continued)

OTHER PUBLICATIONS

International Search Report dated Sep. 4, 2018, issued for PCT/JP2018/026053.

*Primary Examiner* — D Glenn Dayoan
*Assistant Examiner* — Sunsurraye Westbrook
(74) *Attorney, Agent, or Firm* — Locke Lord LLP

(57) ABSTRACT

A dump body includes: a side plate; a flow path which is provided in the side plate and through which an exhaust gas of an engine flows; an exhaust port of the exhaust gas which is provided in an outer surface of the side plate; and a guide surface which has a first inner end portion and a first outer end portion and is inclined downward toward the first outer end portion, the first inner end portion being connected to an outer surface of the side plate below the exhaust port.

6 Claims, 6 Drawing Sheets

(56) References Cited

FOREIGN PATENT DOCUMENTS

| JP | 2010-175221 A | 8/2010 |
| JP | 2014-156245 A | 8/2014 |
| JP | 2015-112907 A | 6/2015 |

\* cited by examiner

DUMP BODY AND DUMP TRUCK

FIELD

The present invention relates to a dump body and a dump truck.

BACKGROUND

A dump truck has a dump body on which a cargo is loaded. When the cargo is discharged from the dump body, the dump truck causes the dump body to erect. When the dump body erects, the cargo is discharged from the dump body by action of gravity. When the cargo is moist, there is a case where at least a part of the cargo is kept in the state of being attached to an inner surface of the dump body so that the cargo is not discharged from the dump body even if the dump body erects. In order to prevent the cargo from adhering to the dump body, there is known a technique of causing an exhaust gas discharged from an engine of the dump truck to flow through a flow path provided in the dump body. As the high-temperature exhaust gas flows through the flow path of the dump body, the dump body is heated by the exhaust gas so that the cargo is dried. As a result, the cargo is prevented from adhering to the dump body.

CITATION LIST

Patent Literature

Patent Literature 1: Japanese Patent Application Laid-Open No. 2015-112907 A

SUMMARY

Technical Problem

The exhaust gas flowing through the flow path of the dump body is discharged from an exhaust port provided in at least a part of the dump body. When the dump truck is used in a snowy terrain or a desert terrain, the exhaust port is provided on a lower surface of the dump body, for example, and snow or sand soars when the exhaust gas is discharged toward the ground, so that rear visibility of a driver may deteriorate in some cases. There is a case where the exhaust port of the exhaust gas is provided on an outer surface of a side plate of the dump body in order to suppress deterioration of the rearward visibility of the driver. The exhaust port of the exhaust gas is provided on the outer surface of the side plate, and the exhaust gas is discharged toward the lateral side of the dump body so that the soaring of snow or sand is suppressed.

When the exhaust gas contains fine particles such as soot, the fine particles and moisture around the fine particles are mixed to form a dark liquid (hereinafter referred to as black juice) in some cases. When the exhaust port is provided on the outer surface of the side plate of the dump body, there is a high possibility that the black juice adheres to the outer surface of a side surface around the exhaust port. In addition, there is a case where the black juice drips from the exhaust port along the outer surface of the side plate due to the action of gravity. When the black juice drips along the outer surface of the side plate, a range where the black juice adheres to the outer surface of the side plate expands so that an appearance of the dump body deteriorates. When the range where the black juice adheres to the outer surface of the side plate expands, labor required for cleaning increases.

An aspect of the present invention is to suppress deterioration of an appearance of a dump body caused by an exhaust gas.

Solution to Problem

According to an aspect of the present invention, a dump body comprises: a side plate; a flow path which is provided in the side plate and through which an exhaust gas of an engine flows; an exhaust port of the exhaust gas which is provided in an outer surface of the side plate; and a guide surface which has a first inner end portion and a first outer end portion and is inclined downward toward the first outer end portion, the first inner end portion being connected to an outer surface of the side plate below the exhaust port.

Advantageous Effects of Invention

According to an aspect of the present invention, it is possible to prevent the deterioration of the appearance of the dump body caused by the exhaust gas.

DESCRIPTION OF EMBODIMENTS

Hereinafter, embodiments of the present invention will be described with reference to the drawings, but the present invention is not limited thereto. Constituent elements of the embodiments to be described below can be appropriately combined. In addition, some constituent elements are not used in some cases.

In the embodiments to be described below, an XYZ orthogonal coordinate system is set, and a positional relationship of each unit will be described with reference to the XYZ orthogonal coordinate system. A direction parallel to an X axis in a predetermined plane is defined as an X-axis direction, a direction parallel to a Y axis in the predetermined plane orthogonal to the X axis is defined as a Y-axis direction, and a direction parallel to a Z axis orthogonal to the predetermined plane is defined as a Z-axis direction. In the embodiment, it is assumed that the XY plane and the horizontal plane are parallel.

The X-axis direction indicates the left-right direction, the Y-axis direction indicates the front-rear direction, and the Z-axis direction indicates the up-down direction. The left-right direction is a direction parallel to a rotation axis of a wheel in which the dump truck is not steered, and is synonymous with a vehicle width direction. The up-down direction means a direction orthogonal to a contact surface of a tire of the dump truck contacting the ground. The front-rear direction is a direction orthogonal to the left-right direction and the up-down direction. A +X direction is the rightward direction, and a −X direction is the leftward direction. A +Y direction is the forward direction, and the −Y direction is the rearward direction. A +Z direction is the upward direction, and a −Z direction is the downward direction.

In the X-axis direction, a direction of separating from a center of the dump truck or a position far from the center of the dump truck will be appropriately referred to as an outer surface side or an outer side in the vehicle width direction, and a direction approaching the center of the dump truck or a position close to the center of the dump truck will be appropriately referred to as an inner surface side or an inner side in the vehicle width direction.

[Dump Truck]

Figure 1:
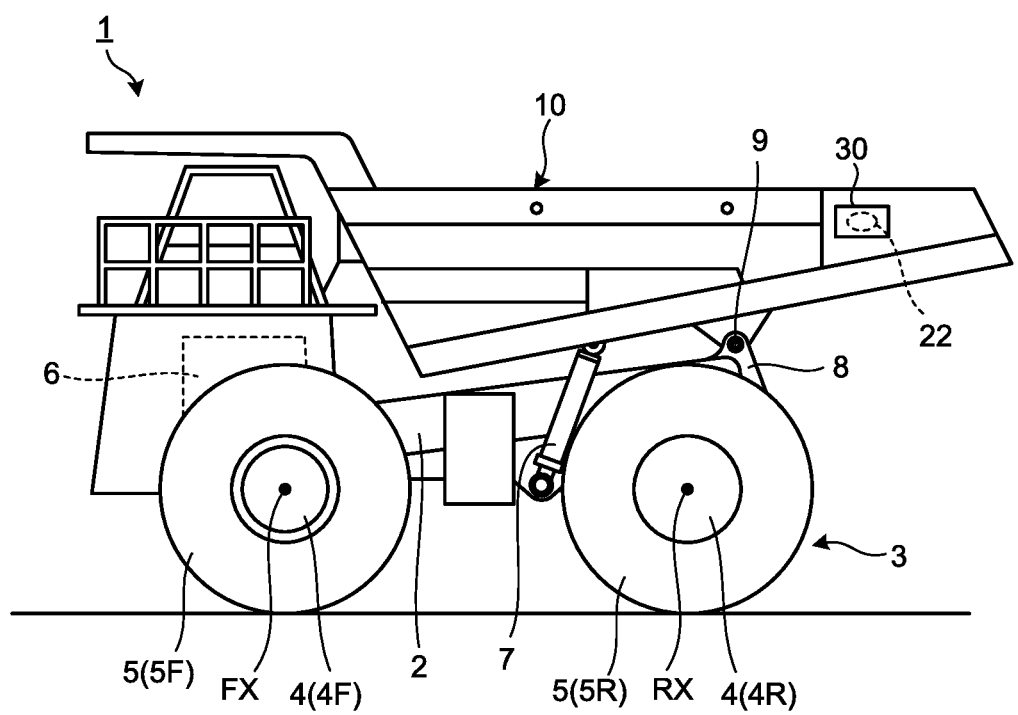
FIG. 1 is a view schematically illustrating a dump truck according to the present embodiment.

FIG. 1 is a view schematically illustrating a dump truck 1 according to the present embodiment. The dump truck 1 is a self-propelled off-road dump truck that operates at a mining site of a mine. The dump truck 1 is a rigid frame type.

As illustrated in FIG. 1, the dump truck 1 includes a dump body 10, a vehicle body 2 supporting the dump body 10, a traveling device 3 that travels while supporting the vehicle body 2, an engine 6 that generates power, a hoist cylinder 7 that derricks the dump body 10.

A cargo is loaded on the dump body 10. The dump truck 1 is a rear dump type and discharges the cargo from the dump body 10 by tilting the dump body 10 rearward. The dump body 10 is connected to a bracket 8 of the vehicle body 2 via a rotation pin 9. A lower part of the rear portion of the dump body 10 and the bracket 8 are connected. The dump body 10 is rotatable about the rotation pin 9. A rotation axis of the dump body 10 is parallel to the X axis.

The dump body 10 is derricked by rotating about the rotation pin 9 and can change to at least one of a loading posture and an upright posture. The loading posture refers to a posture in which the dump body 10 is lowered to approach the vehicle body 2 the most in a movable range of the dump body 10 and seated on the vehicle body 2. The upright posture refers to a posture in which the dump body 10 rises to be away farthest from the vehicle body 2 in the movable range of the dump body 10. In the loading posture of the dump body 10, a cargo is loaded on the dump body 10, and the dump truck 1 can travel. In the upright posture of the dump body 10, the cargo is discharged from the dump body 10.

The hoist cylinder 7 is arranged between the vehicle body 2 and the dump body 10. The dump body 10 is adjusted to at least one of the loading posture and the upright posture by power generated by the hoist cylinder 7.

The traveling device 3 has wheels 4. Tires 5 are mounted to the wheels 4. As the wheel 4 rotates, the dump truck 1 travels. The wheel 4 includes a front wheel 4F rotating about a rotation axis FX and a rear wheel 4R rotating about a rotation axis RX. The tires 5 include a front tire 5F mounted on the front wheel 4F and a rear tire 5R mounted on the rear wheel 4R. Further, the traveling device 3 has a steering device for changing the direction of the front wheel 4F. The rear wheel 4R is not steered. The X-axis direction is a direction parallel to the rotation axis RX of the rear wheel 4R.

The engine 6 is provided on the vehicle body 2. The engine 6 includes an internal combustion engine such as a diesel engine. The engine 6 burns fuel to generate power. As the fuel burns, an exhaust gas is discharged from the engine 6.

The traveling device 3 is operated by the power generated by the engine 6. The power generated by the engine 6 is transmitted to the rear wheel 4R. As the rear wheel 4R rotates, the traveling device 3 travels.

[Dump Body]

Figure 2:
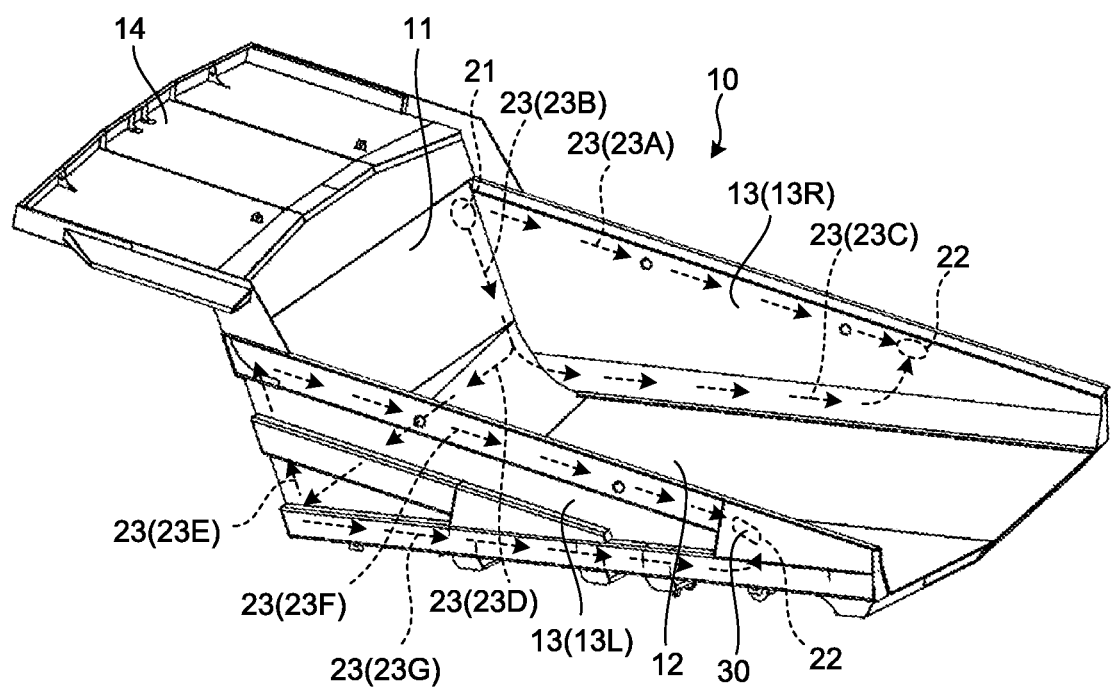
FIG. 2 is a perspective view illustrating a dump body according to the present embodiment.
Figure 2:
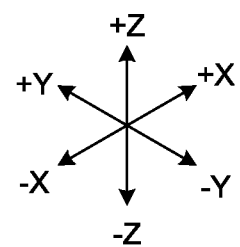
Figure 3:
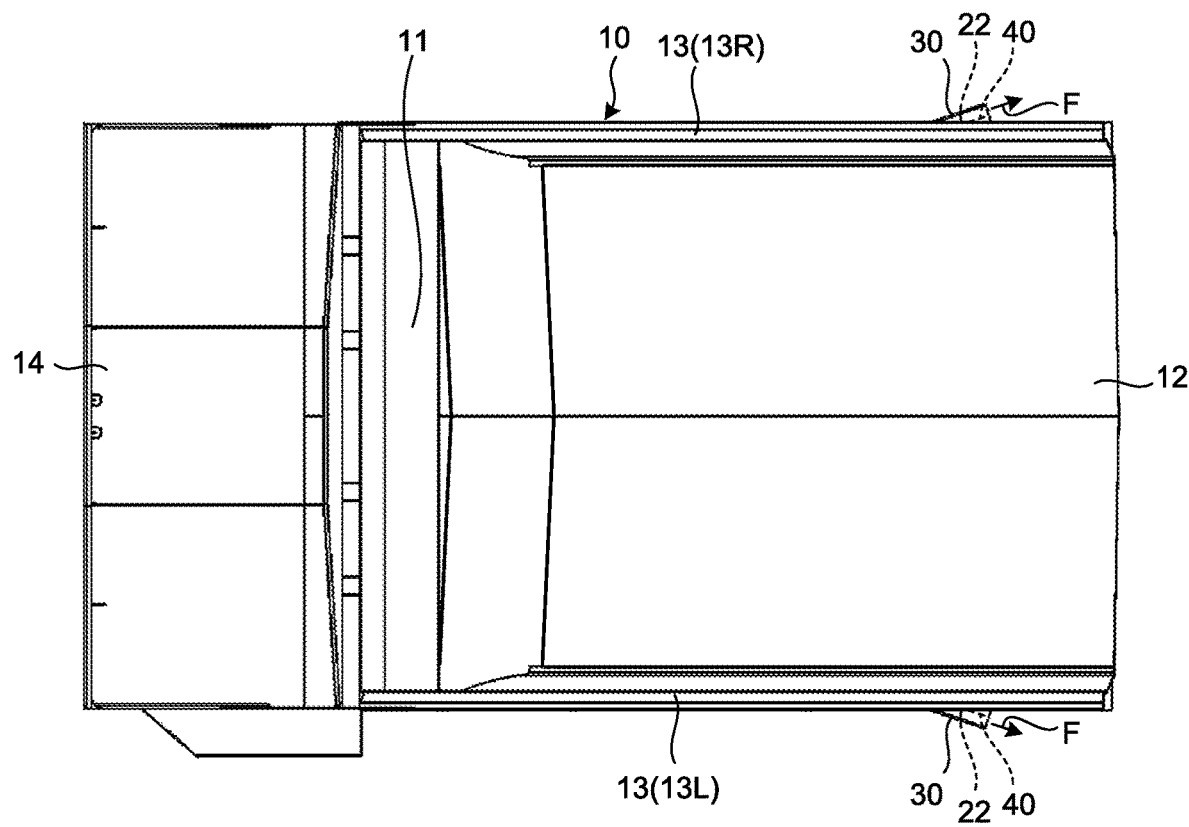
FIG. 3 is a top view illustrating the dump body according to the present embodiment.

FIG. 2 is a perspective view illustrating the dump body 10 according to the present embodiment. FIG. 3 is a top view illustrating the dump body 10 according to the present embodiment. As illustrated in FIGS. 2 and 3, the dump body 10 includes a front plate 11, a bottom plate 12 connected to a lower end portion of the front plate 11, side plates 13 connected to right and left end portions of the front plate 11 and right and left end portions of the bottom plate 12, and a protector plate 14 connected to an upper end portion of the front plate 11.

The front plate 11, the bottom plate 12, the side plates 13, and the protector plate 14 are integrated. The front plate 11, the bottom plate 12, the side plates 13, and the protector plate 14 are made of a steel material.

In the loading posture of the dump body 10, the protector plate 14 is arranged above a cab of the vehicle body 2. A rear end portion of the protector plate 14 and the upper end portion of the front plate 11 are connected. The lower end portion of the front plate 11 and a front end portion of the bottom plate 12 are connected.

The side plates 13 are arranged on the right side (+X side) and on the left side (−X side) of the center of the dump body 10 in the left-right direction. The side plate 13 includes a right side plate 13R, arranged on the right side of the center of the dump body 10 and connected to each of the right end portion of the front plate 11 and the right end portion of the bottom plate 12, and a left side plate 13L arranged on the left side of the center of the dump body 10 and connected to each of the left end portion of the front plate 11 and the left end portion of the bottom plate 12.

The front plate 11 has a front surface facing the front side (+Y direction) and a rear surface facing a direction opposite to the front surface. The bottom plate 12 has a bottom surface facing the upper side (+Z direction) and a lower surface facing a direction opposite to the bottom surface.

The side plate 13 has an inner surface facing a side of the center of the dump body 10 in the left-right direction and an outer surface facing a direction opposite to the inner surface.

In the dump body 10, a loading space in which the cargo is loaded is defined between the rear surface of the front plate 11, the bottom surface of the bottom plate 12, and the inner surface of the side plate 13.

The dump body 10 has an inlet port 21 into which the exhaust gas of the engine 6 is introduced, a flow path 23 through which the exhaust gas flows, and an exhaust port 22 from which the exhaust gas is discharged. In the flow path 23, a side of the inlet port 21 is synonymous with the upstream side of the exhaust gas, and a side of the exhaust port 22 is synonymous with the downstream side of the exhaust gas.

The inlet port 21 is provided on the front surface of the front plate 11. The inlet port 21 is provided at an upper right portion of the front surface of the front plate 11. Incidentally, the inlet port 21 may be provided in the central portion of the front surface in the left-right direction.

The vehicle body 2 has a conduit that guides the exhaust gas discharged from the engine 6 to the inlet port 21. In the loading posture of the dump body 10, an outlet of the conduit and the inlet port 21 are connected. In the loading posture of the dump body 10, the exhaust gas of the engine 6 is supplied to the inlet port 21. In the upright posture of the dump body 10, the outlet of the conduit and the inlet port 21 are separated. In the upright posture of the dump body 10, the exhaust gas of the engine 6 is discharged from the outlet of the conduit.

The exhaust port 22 is provided on the outer surface of the side plate 13. The exhaust port 22 is provided in each of the right side plate 13R and the left side plate 13L. The exhaust port 22 is provided at a rear portion of the upper end portion of the outer surface of the side plate 13.

The flow path 23 is provided inside the dump body 10. At least a part of the flow path 23 is provided in the side plate 13. The exhaust gas discharged from the engine 6 flows into the flow path 23 from the inlet port 21. The exhaust gas flowing through the flow path 23 is discharged from the exhaust port 22.

The flow path 23 includes a first flow path 23A provided at an upper end portion of the right side plate 13R, a second flow path 23B provided at a boundary between the front plate 11 and the right side plate 13R, a third flow path 23C provided at a lower end portion of the right side plate 13R, a fourth flow path 23D provided at a boundary between the front plate 11 and the bottom plate 12, a fifth flow path 23E provided at a boundary between the front plate 11 and the left side plate 13L, a sixth flow path 23F provided at an upper end portion of the left side plate 13L, and a seventh flow path 23G provided at a lower end portion of the left side plate 13L.

Each of the upper end portion and the lower end portion of the right side plate 13R includes a strength member such as a rib. Each of the upper end portion and the lower end portion of the left side plate 13L includes a strength member such as a rib. The first flow path 23A, the third flow path 23C, the sixth flow path 23F, and the seventh flow path 23G are provided in the strength member of the dump body 10.

The first flow path 23A extends in the Y-axis direction at the upper end portion of the right side plate 13R. The first flow path 23A may be inclined with respect to the Y-axis direction. A front end portion of the first flow path 23A is connected to the inlet port 21. The exhaust gas flowing into the first flow path 23A from the inlet port 21 flows through the first flow path 23A toward a rear end portion of the first flow path 23A.

The second flow path 23B is provided at the boundary between the front plate 11 and the right side plate 13R. The second flow path 23B is inclined in the −Y direction toward the −Z direction. An upper end portion of the second flow path 23B is connected to the inlet port 21. The exhaust gas flowing into the second flow path 23B from the inlet port 21 flows through the second flow path 23B toward a lower end portion of the second flow path 23B.

The third flow path 23C is provided at the lower end portion of the right side plate 13R. The third flow path 23C is inclined in the +Z direction toward the −Y direction. A front end portion of the third flow path 23C is connected to the lower end portion of the second flow path 23B. The exhaust gas flowing from the second flow path 23B into the third flow path 23C flows through the third flow path 23C toward a rear end portion of the third flow path 23C.

The fourth flow path 23D extends in the X-axis direction at the boundary between the front plate 11 and the bottom plate 12. A right end portion of the fourth flow path 23D is connected to the lower end portion of the second flow path 23B. The exhaust gas flowing from the second flow path 23B into the fourth flow path 23D flows through the fourth flow path 23D toward a left end portion of the fourth flow path 23D.

The fifth flow path 23E is provided at the boundary between the front plate 11 and the left side plate 13L. The fifth flow path 23E is inclined in the +Y direction toward the +Z direction. A lower end portion of the fifth flow path 23E is connected to the left end portion of the fourth flow path 23D. The exhaust gas flowing from the fourth flow path 23D into the fifth flow path 23E flows through the fifth flow path 23E toward an upper end portion of the fifth flow path 23E.

The sixth flow path 23F extends in the Y-axis direction at the upper end portion of the left side plate 13L. The sixth flow path 23F may be inclined with respect to the Y-axis direction. A front end portion of the sixth flow path 23F is connected to the upper end portion of the fifth flow path 23E. The exhaust gas flowing from the fifth flow path 23E to the sixth flow path 23F flows through the sixth flow path 23F toward a rear end portion of the sixth flow path 23F.

The seventh flow path 23G is provided at the lower end portion of the left side plate 13L. The seventh flow path 23G is inclined in the +Z direction toward the −Y direction. A front end portion of the seventh flow path 23G is connected to the left end portion of the fourth flow path 23D. The exhaust gas flowing from the fourth flow path 23D into the seventh flow path 23G flows through the seventh flow path 23G toward a rear end portion of the seventh flow path 23G.

Each of the rear end portion of the first flow path 23A, the rear end portion of the third flow path 23C, the rear end portion of the sixth flow path 23F, and the rear end portion of the seventh flow path 23G is connected to the exhaust port 22. The exhaust port 22 is provided in each of the right side plate 13R and the left side plate 13L. The rear end portion of the first flow path 23A and the rear end portion of the third flow path 23C are connected to the exhaust port 22 of the right side plate 13R. The rear end portion of the sixth flow path 23F and the rear end portion of the seventh flow path 23G are connected to the exhaust port 22 of the left side plate 13L. The exhaust gas flowing through the flow path 23 is discharged from the exhaust port 22 to an outer surface side (lateral side) of the side plate 13.

The exhaust gas supplied from the engine 6 to the inlet port 21 is branched into the first flow path 23A and the second flow path 23B. As a result, an exhaust resistance of the engine 6 is reduced, and deterioration of the fuel consumption rate of the engine 6 is suppressed.

[Cover Member and Flow Regulation Member]

The dump body 10 includes a cover member 30 covering the exhaust port 22 and a flow regulation member 40 supported by the cover member 30. The cover member 30 and the flow regulation member 40 are provided at the exhaust port 22 of the right side plate 13R and the exhaust port 22 of the left side plate 13L, respectively, as illustrated in FIG. 3.

Figure 4:
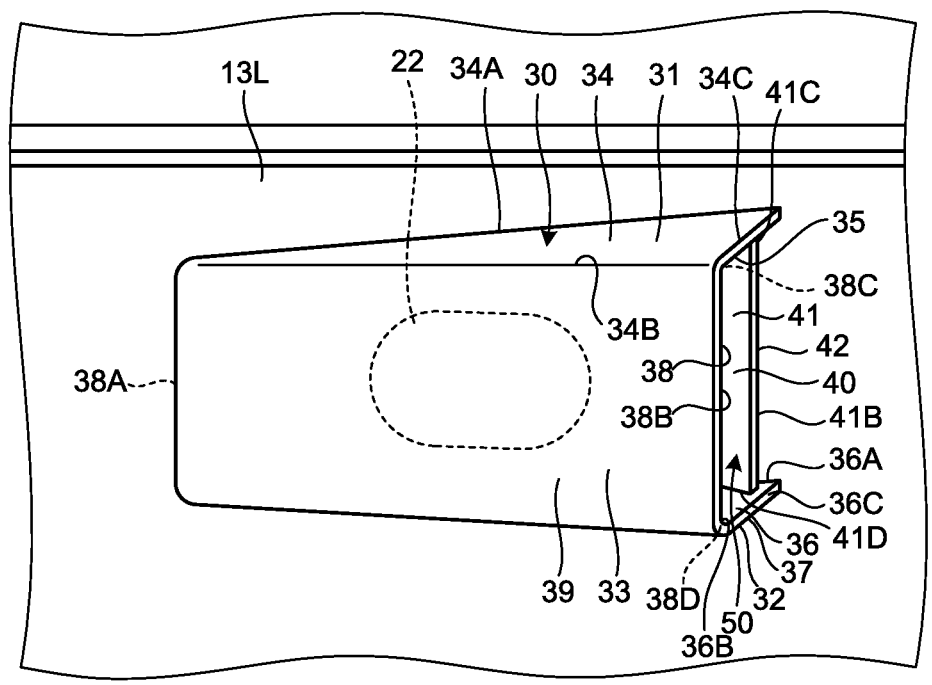
FIG. 4 is a side view illustrating a cover member and a flow regulation member according to the present embodiment.
Figure 4:
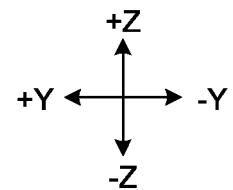
Figure 5:
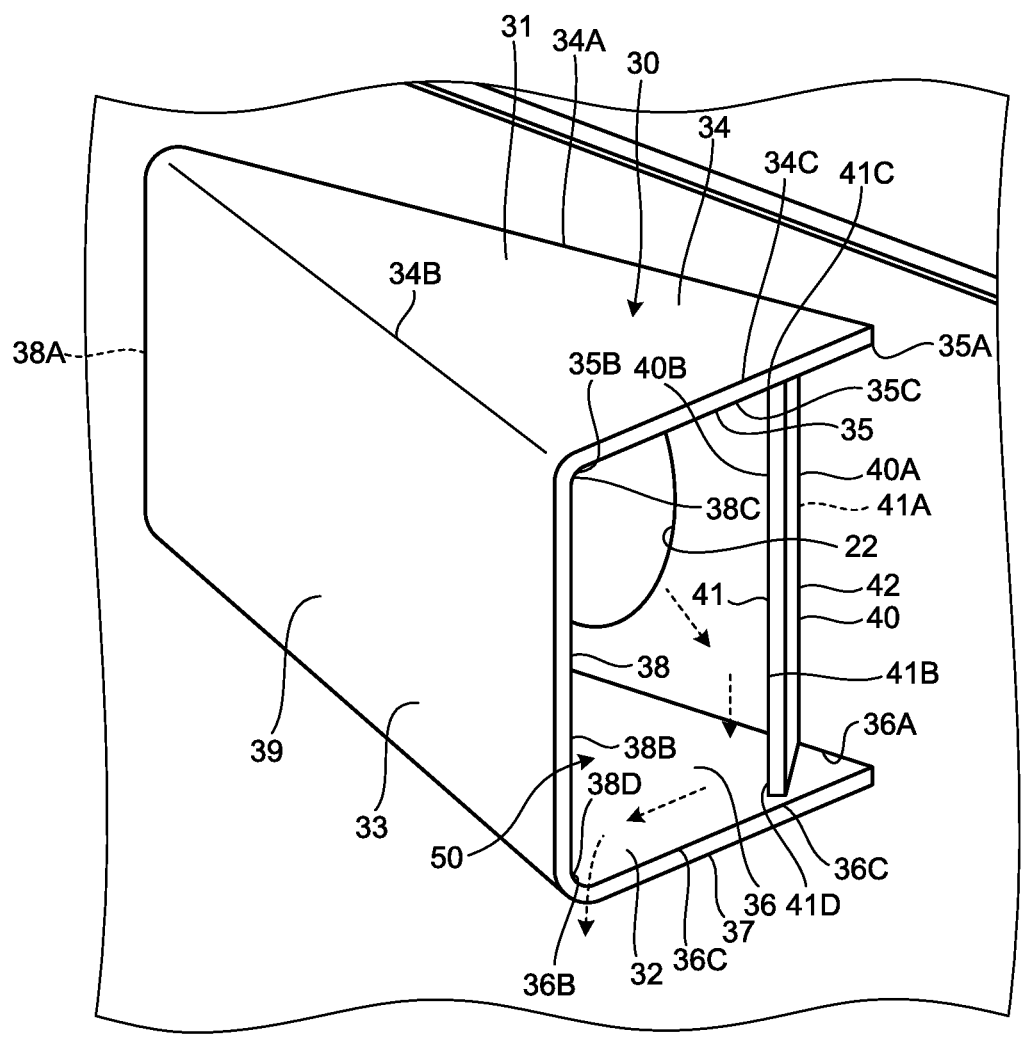
FIG. 5 is a perspective view illustrating the cover member and the flow regulation member according to the present embodiment.
Figure 5:
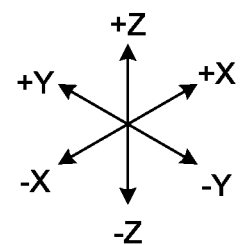
Figure 6:
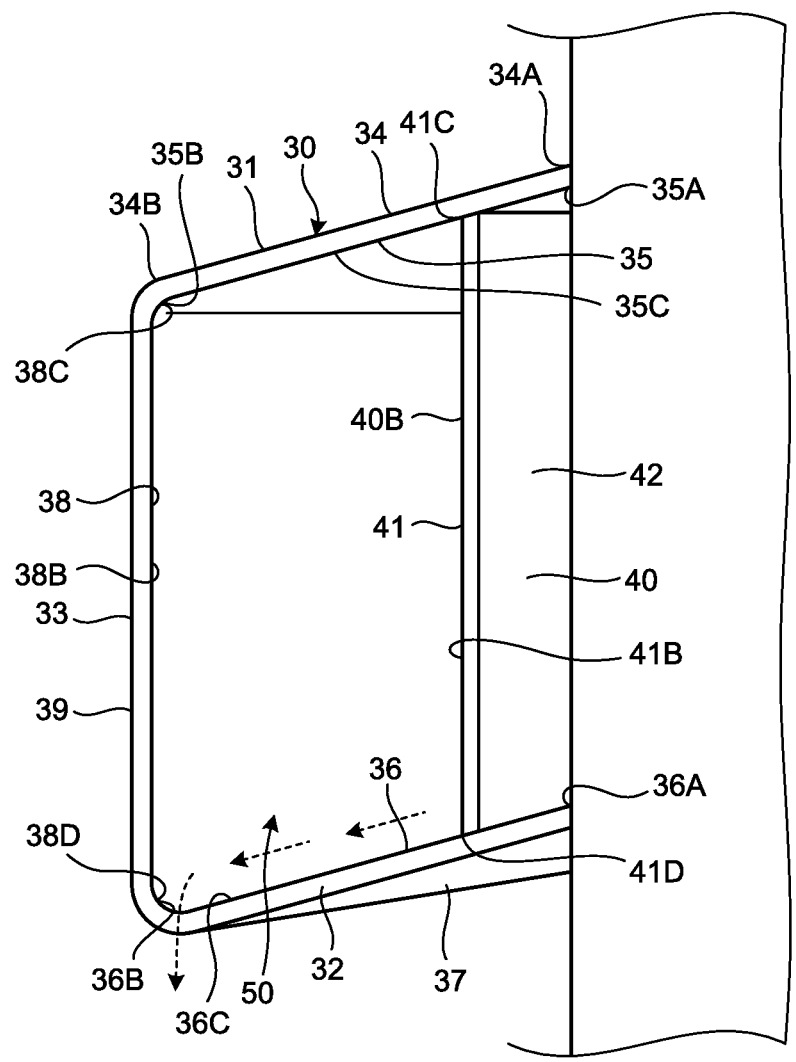
FIG. 6 is a rear view illustrating the cover member and the flow regulation member according to the present embodiment.
Figure 6:
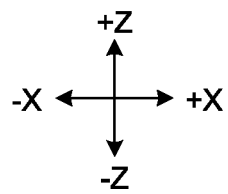

FIG. 4 is a side view illustrating the cover member 30 and the flow regulation member 40 according to the present embodiment. FIG. 5 is a perspective view illustrating the cover member 30 and the flow regulation member 40 according to the present embodiment. FIG. 6 is a rear view illustrating the cover member 30 and the flow regulation member 40 according to the present embodiment. FIGS. 4, 5, and 6 illustrate the cover member 30 and the flow regulation member 40 provided in the exhaust port 22 of the left side plate 13L. The cover member 30 and the flow regulation member 40 provided at the exhaust port 22 of the left side plate 13L and the cover member 30 and the flow regulation member 40 provided at the exhaust port 22 of the right side plate 13R have the same structure. Hereinafter, the cover member 30 and the flow regulation member 40 provided at the exhaust port 22 of the left side plate 13L will be mainly described, and a description regarding the cover member 30 and the flow regulation member 40 provided at the exhaust port 22 of the right side plate 13R will be simplified or omitted.

As illustrated in FIGS. 4, 5, and 6, the cover member 30 includes an upper plate 31 arranged above the exhaust port 22, a lower plate 32 arranged below the exhaust port 22, and an opposing plate 33 arranged so as to oppose the exhaust port 22. The upper plate 31, the lower plate 32, and the opposing plate 33 are integrated. The cover member 30 is made of a steel material. The cover member 30 is manufactured by bending a single steel plate. The cover member 30 is connected to the outer surface of the side plate 13 by welding. Incidentally, the cover member 30 may be manufactured by separately preparing the upper plate 31, the lower plate 32, and the opposing plate 33 and bonding and the upper plate 31, the lower plate 32, and the opposing plate 33 by welding to be integrated.

The upper plate 31 has an upper surface 34 facing the upper side and a lower surface 35 facing a direction opposite to the upper surface 34. The upper surface 34 and the lower surface 35 are parallel. An outer shape of the upper surface 34 and an outer shape of the lower surface 35 are triangular in a plane orthogonal to the Z axis.

A dimension of the upper plate 31 is longer than a dimension of the exhaust port 22 in the Y-axis direction. A front end portion (end portion on the +Y side) of the upper plate 31 is arranged on the front side (+Y direction) of the front end portion (end portion on the +Y side) of the exhaust port 22. A rear end portion (end portion on the −Y side) of the upper plate 31 is arranged on the rear side (−Y direction) of the rear end portion (end portion on the −Y side) of the exhaust port 22.

The upper surface 34 has an inner end portion 34A (a second inner end portion), an outer end portion 34B (a second outer end portion) arranged on the outer side of the inner end portion 34A in the vehicle width direction, and a rear end portion 34C.

The inner end portion 34A extends in the Y-axis direction. The inner end portion 34A is connected to a partial region of the outer surface of the side plate 13 above the upper end portion of the exhaust port 22.

The outer end portion 34B is inclined to be away from the outer surface of the side plate 13 toward the −Y direction. A front end portion of the outer end portion 34B is connected to a front end portion of the inner end portion 34A.

The rear end portion 34C connects a rear end portion of the inner end portion 34A and a rear end portion of the outer end portion 34B.

As illustrated in FIG. 6, the upper surface 34 is inclined downward from the inner end portion 34A toward the outer end portion 34B. That is, the upper surface 34 is inclined downward toward the outer side in the vehicle width direction.

The lower surface 35 is parallel to the upper surface 34 and is substantially congruent with the upper surface 34. The lower surface 35 has an inner end portion 35A, an outer end portion 35B arranged on the outer side of the inner end portion 35A in the vehicle width direction, and a rear end portion 35C.

The lower plate 32 has a guide surface 36 facing the upper side and a lower surface 37 facing a direction opposite to the guide surface 36. The guide surface 36 and the lower surface 37 are parallel. An outer shape of the guide surface 36 and an outer shape of the lower surface 37 are triangular in the plane orthogonal to the Z axis.

A dimension of the lower plate 32 is longer than a dimension of the exhaust port 22 in the Y-axis direction. The front end portion (end portion on the +Y side) of the lower plate 32 is arranged on the front side (+Y direction) of the front end portion (end portion on the +Y side) of the exhaust port 22. The rear end portion (end portion on the −Y side) of the lower plate 32 is arranged on the rear side (−Y direction) of the rear end portion (end portion on the −Y side) of the exhaust port 22.

The guide surface 36 includes an inner end portion 36A (a first inner end portion), an outer end portion 36B (a first outer end portion) arranged on the outer side of the inner end portion 36A in the vehicle width direction, and a rear end portion 36C.

The inner end portion 36A extends in the Y-axis direction. The inner end portion 36A is connected to a partial region of the outer surface of the side plate 13 below the lower end portion of the exhaust port 22.

The outer end portion 36B is inclined to be away from the outer surface of the side plate 13 toward the −Y direction. A front end portion of the outer end portion 36B is connected with a front end portion of the inner end portion 36A.

The rear end portion 36C connects a rear end portion of the inner end portion 36A and a rear end portion of the outer end portion 36B.

As illustrated in FIG. 6, the guide surface 36 is inclined downward from the inner end portion 36A toward the outer end portion 36B. That is, the guide surface 36 is inclined downward toward the outer side in the vehicle width direction.

The lower surface 37 is parallel to the guide surface 36 and is substantially congruent with the guide surface 36. In the present embodiment, an outer shape and a dimension of the guide surface 36 are substantially equal to an outer shape and a dimension of the upper surface 34, respectively. In addition, an inclination angle of the guide surface 36 with respect to the outer surface of the side plate 13 is substantially equal to an inclination angle of the upper surface 34 with respect to the outer surface of the side plate 13.

The opposing plate 33 has an opposing surface 38 opposing the exhaust port 22 and an outer surface 39 facing a direction opposite to the opposing surface 38. The opposing surface 38 and the outer surface 39 are parallel. An outer shape of the opposing surface 38 and an outer shape of the outer surface 39 are rectangular in the plane orthogonal to the X axis.

In the Y-axis direction, a dimension of the opposing plate 33 is longer than a dimension of the exhaust port 22. The front end portion (end portion on the +Y side) of the opposing plate 33 is arranged on the front side (+Y direction) of the front end portion (end portion on the +Y side) of the exhaust port 22. A rear end portion (end portion on the −Y side) of the opposing plate 33 is arranged on the rear side (−Y direction) of the rear end portion (end portion on the −Y side) of the exhaust port 22.

The opposing surface 38 includes a front end portion 38A (first front end portion), a rear end portion 38B (first rear end portion) arranged on the −Y side of the front end portion 38A, an upper end portion 38C, and a lower end portion 38D arranged on the −Z side of the upper end portion 38C.

The front end portion 38A extends in the Z-axis direction. The front end portion 38A is connected to a partial region of the outer surface of the side plate 13 in front of the front end portion of the exhaust port 22.

The rear end portion 38B extends in the Z-axis direction. The rear end portion 38B is arranged at the rear of the rear end portion of the exhaust port 22. The rear end portion 38B is away from the outer surface of the side plate 13.

The upper end portion 38C extends in the Y-axis direction. The upper end portion 38C is arranged above the upper end portion of the exhaust port 22. The upper end portion 38C connects an upper end portion of the front end portion 38A and an upper end portion of the rear end portion 38B. The upper end portion 38C is inclined to be away from the outer surface of the side plate 13 as extending in the −Y direction.

The lower end portion 38D extends in the Y-axis direction. The lower end portion 38D is arranged below the lower end portion of the exhaust port 22. The lower end portion 38D connects a lower end portion of the front end portion 38A and a lower end portion of the rear end portion 38B. The lower end portion 38D is inclined to be away from the outer surface of the side plate 13 as extending in the −Y direction.

The outer end portion 35B of the lower surface 35 and the upper end portion 38C of the opposing surface 38 are connected. The outer end portion 36B of the guide surface 36 and the lower end portion 38D of the opposing surface 38 are connected.

The flow regulation member 40 is arranged at the rear of the exhaust port 22. The flow regulation member 40 is arranged between the upper plate 31 and the lower plate 32. The flow regulation member 40 is formed of a steel material. The flow regulation member 40 is in the form of a plate. An inner end portion 40A of the flow regulation member 40 is connected to the outer surface of the side plate 13 by welding. An upper end portion of the flow regulation member 40 is connected to the lower surface 35 of the upper plate 31 by welding. A lower end portion of the flow regulation member 40 is connected to the guide surface 36 of the lower plate 32 by welding. An outer end portion 40B of the flow regulation member 40 is away from the side plate 13. The outer end portion 40B of the flow regulation member 40 is arranged on the +Y side of the rear end portion of the cover member 30 in the Y-axis direction. That is, the flow regulation member 40 is arranged at the inner side of the cover member 30 so as not to protrude from the cover member 30.

The flow regulation member 40 has a flow regulation surface 41 facing the front side and a rear surface 42 facing a direction opposite to the flow regulation surface 41. The flow regulation surface 41 is a flat surface. The flow regulation surface 41 and the rear surface 42 are parallel. An outer shape of the flow regulation surface 41 and an outer shape of the rear surface 42 are rectangular.

A dimension of the flow regulation member 40 is longer than a dimension of the exhaust port 22 in the Z-axis direction. An upper end portion (end portion on the +Z side) of the flow regulation member 40 is arranged above (+Z direction) the upper end portion (end portion on the +Z side) of the exhaust port 22. A lower end portion (end portion on the −Z side) of the flow regulation member 40 is arranged below (−Z direction) the lower end portion (end portion on the −Z side) of the exhaust port 22.

The flow regulation surface 41 has a front end portion 41A (a second front end portion), a rear end portion 41B (a second rear end portion) arranged at the rear of the front end portion 41A, an upper end portion 41C, and a lower end portion 41D arranged on the −Z side of the upper end portion 41C.

The front end portion 41A extends in the Z-axis direction. The front end portion 41A is connected to a partial region of the outer surface of the side plate 13 at the rear of the rear end portion of the exhaust port 22.

The rear end portion 41B extends in the Z-axis direction. The rear end portion 41B is away from the outer surface of the side plate 13.

The upper end portion 41C extends in the Y-axis direction. The upper end portion 41C is arranged above the upper end portion of the exhaust port 22. The upper end portion 41C connects an upper end portion of the front end portion 41A and an upper end portion of the rear end portion 41B. The upper end portion 38C is inclined to be away from the outer surface of the side plate 13 as extending in the −Y direction.

The lower end portion 41D extends in the Y-axis direction. The lower end portion 41D is arranged below the lower end portion of the exhaust port 22. The lower end portion 41D connects a lower end portion of the front end portion 41A and a lower end portion of the rear end portion 41B. The lower end portion 41D is inclined so as to be away from the outer surface of the side plate 13 as extending in the −Y direction.

The lower surface 35 and the upper end portion 41C of the flow regulation surface 41 are connected. The guide surface 36 and the lower end portion 41D of the flow regulation surface 41 are connected.

The flow regulation surface 41 is inclined so as to be away from the outer surface of the side plate 13 from the front end portion 41A toward the rear end portion 41B.

The rear surface 42 is parallel to the flow regulation surface 41 and is substantially congruent with the flow regulation surface 41.

The rear end portion 35C of the lower surface 35, the rear end portion 36C of the guide surface 36, the rear end portion 38B of the opposing surface 38, and the rear end portion 41B of the flow regulation surface 41 define an opening 50. The exhaust gas discharged from the exhaust port 22 is guided to the opening 50 by the lower surface 35 of the upper plate 31, the guide surface 36 of the lower plate 32, the opposing surface 38 of the opposing plate 33, and the flow regulation surface 41 of the flow regulation member 40. The exhaust gas is discharged to the rear side of the cover member 30 and the flow regulation member 40 via the opening 50.

A size of the opening area of the opening 50 is larger than a size of the opening area of the exhaust port 22. As a result, the exhaust resistance of the exhaust gas discharged from the exhaust port 22 is suppressed. The exhaust gas discharged from the exhaust port 22 is smoothly discharged from the opening 50.

[Operation]

Next, an operation of the dump body 10 will be described. When the engine 6 is driven, exhaust gas is discharged from the engine 6. The exhaust gas discharged from the engine 6 is supplied to the inlet port 21 via the conduit provided in the vehicle body 2. The exhaust gas flows into the flow path 23 via the inlet port 21. The exhaust gas flowing through the flow path 23 is discharged from the exhaust port 22. The exhaust port 22 is provided on the outer surface of the side plate 13. Thus, the exhaust gas discharged from the exhaust port 22 is discharged to the lateral side of the dump body 10 without being injected to the ground on which the dump truck 1 travels. As the exhaust gas is discharged toward the side of the dump body 10, snow or sand is prevented from soaring due to the exhaust gas even in the case where the dump truck 1 is used in a snowy area or a desert area. Thus, the deterioration of the rearward visibility of the driver is suppressed.

When the exhaust gas contains fine particles such as soot, the fine particles and moisture around the fine particles are mixed to generate black juice in some cases. As indicated by dotted arrows in FIGS. 5 and 6, the black juice generated at the exhaust port 22 drips from the exhaust port 22 to the inner end portion 36A of the guide surface 36 along the outer surface of the side plate 13 by the action of gravity. The guide surface 36 is inclined downward from the inner end portion 36A toward the outer end portion 36B. Thus, the black juice dripped on the inner end portion 36A of the guide surface 36 flows on the guide surface 36 toward the outer end portion 36B while being guided by the guide surface 36 by the action of gravity. At least a part of the black juice that has reached the outer end portion 36B falls from the outer end portion 36B to the outside of the cover member 30. A defined region of a part of the outer surface of the side plate 13 is covered with the cover member 30. That is, when the dump body 10 is viewed from the left side, the defined region of the outer surface of the side plate 13 is concealed by the cover member 30. Except for the defined region of the outer surface of the side plate 13 concealed by the cover member 30, the adhesion of the black juice to the outer surface of the side plate 13 and expansion of a range where the black juice adheres to the outer surface of the side plate 13 are suppressed.

At least a part of the exhaust gas discharged from the exhaust port 22 hits the opposing surface 38 to be guided to the rear side by the opposing surface 38. At least a part of the exhaust gas discharged from the exhaust port 22 and moved to the rear side hits the flow regulation surface 41 to be guided in a direction to be away from the outer surface of the side plate 13. The exhaust gas hitting the opposing surface 38 and the exhaust gas hitting the flow regulation surface 41 are discharged to the rear side of the cover member 30 and the flow regulation member 40 via the opening 50. The exhaust gas discharged from the exhaust port 22 is guided to be away from the outer surface of the side plate 13 by the flow regulation surface 41 as indicated by an arrow F in FIG. 3. Therefore, contamination of the appearance such as discoloration caused by burning of the surface of the side plate 13 as the exhaust gas directly hits the outer surface of the side plate 13.

[Effect]

As described above, the guide surface 36 in which the inner end portion 36A is connected to the outer surface of the side plate 13 below the lower end portion of the exhaust port 22 and is inclined downward toward the outer end portion 36B is provided according to the present embodiment. As a result, even if the black juice is generated at the exhaust port 22, the black juice dripped from the exhaust port 22 to the inner end portion 36A of the guide surface 36 flows toward the outer end portion 36B while being guided by the guide surface 36 by the action of gravity, and falls from the cover member 30 via the outer end portion 36B. The black juice generated at the exhaust port 22 is guided by the guide surface 36 so as to be away from the side plate 13 and then falls without dripping along the outer surface of the side plate 13, and thus, the expansion of the range where the black juice adheres to the outer surface of the side plate 13 is suppressed. Therefore, the deterioration of the appearance of the dump body 10 is suppressed.

In the present embodiment, the front end portion 38A of the cover member 30 is connected to the outer surface of the side plate 13 in front of the front end portion of the exhaust port 22, and the rear end portion 38B is away from the outer surface of the side plate 13, and the opposing surface 38 opposing the exhaust port 22 is provided. Thereby, the exhaust gas discharged from the exhaust port 22 is prevented from being injected to the front side (+Y direction) and the lateral side (−X direction). The exhaust gas discharged from the exhaust port 22 is injected to the rear side (−Y direction) via the opening 50. As a result, expansion of the contact area between the side plate 13 around the exhaust port 22 and the exhaust gas discharged from the exhaust port 22 is suppressed, and thus, the contamination such as the discoloration caused by burning of the surface of the side plate 13 due to the exhaust gas is suppressed.

The outer end portion 36B of the guide surface 36 and the lower end portion 38D of the opposing surface 38 are connected in the present embodiment. As a result, the cover member 30 can discharge the black juice to the outside through a corner defined by the rear end portion of the outer end portion 36B of the guide surface 36 and the rear end portion of the lower end portion 38D of the opposing surface 38.

The upper surface 34 in which the inner end portion 34A is connected to the outer surface of the side plate 13 above the upper end portion of the exhaust port 22 and is inclined downward toward the outer end portion 34B is provided in the present embodiment. As a result, rainwater is prevented from entering the exhaust port 22. Since the rainwater is prevented from entering the exhaust port 22, the generation of black juice is suppressed. In addition, the rainwater falling on the upper surface 34 flows toward the outer end portion 34B of the upper surface 34 by the action of gravity and is removed downward without staying on the upper surface 34. In addition, since the upper surface 34 is inclined downward, sand, dust, or the like hardly stays on the upper surface 34, and it is possible to maintain the appearance of the cover member 30.

In the present embodiment, the front end portion 41A of the flow regulation member 40 is connected to the outer surface of the side plate 13 at the rear of the rear end portion of the exhaust port 22, and the flow regulation surface 41 inclined so as to be away from the outer surface of the side plate 13 toward the rear end portion 41B is provided. As a result, the exhaust gas discharged from the exhaust port 22 flows to be away from the side plate 13, and thus, the contact between the side plate 13 at the rear of the exhaust port 22 and the exhaust gas discharged from the exhaust port 22 is suppressed. Thus, the contamination such as the discoloration caused by burning of the surface of the side plate 13 due to the exhaust gas is suppressed.

Other Embodiments

Incidentally, the guide surface 36 may be a flat surface or a curved surface in the above embodiment. It suffices if the black juice dripped on the inner end portion 36A by the action of gravity can move to the outer end portion 36B.

Incidentally, at least one of the upper plate 31 and the opposing plate 33 of the cover member 30 may be omitted in the above embodiment. In addition, both of the upper surface 31 and the opposing surface 33 of the cover member 30 may be omitted. That is, the cover member 30 includes only the lower plate 32 having the guide surface 36 and does not necessarily include the upper plate 31 and the opposing plate 33.

Incidentally, the flow regulation surface 41 may be a flat surface or a curved surface in the above embodiment. It suffices if it is possible to suppress the contact between the exhaust gas discharged to the rear of the exhaust port 22 and the outer surface of the side plate 13.

Incidentally, when the cover member 30 is viewed from any one of the upward direction, the downward direction, the rightward direction, and the leftward direction, at least a part of the flow regulation member 40 may be exposed without being covered by the cover member 30.

Incidentally, the flow regulation member 40 may be omitted in the above embodiment.

Incidentally, the exhaust port 22 is provided at a rear portion of the upper end portion of the outer surface of the side plate 13 in the above embodiment. The exhaust port 22 may be provided at a rear portion of the lower end portion of the outer surface of the side plate 13.

Incidentally, the cover member 30 is a member obtained by combining the upper plate 31, the lower plate 32, and the opposing plate 33 in the above embodiment. The cover member 30 may be a pipe-like member having an inlet connected to the exhaust port 22 and an outlet from which the exhaust gas is discharged. As the pipe-like member is connected to the outer surface of the side plate 13 so as to incline downward toward the outlet, the black juice generated in the exhaust port 22 is discharged from the outlet of the pipe-like member along an inner surface of the pipe-like member without dripping on the outer surface of the side plate 13. In this case, a part of the inner surface of the pipe-like member functions as a guide surface so that the expansion of the range where the black juice adheres to the outer surface of the side plate 13 is suppressed. Therefore, the deterioration of the appearance of the dump body 10 is suppressed.

Incidentally, the dump truck 1 is assumed to be the rigid frame type in the above embodiment. The dump truck 1 may be an articulated type.

Incidentally, the dump truck 1 is assumed to be a rear dump type in the above embodiment. The dump truck 1 may be a side dump type in which a cargo is discharged from the dump body 10 by tilting the dump body 10 to the left or right.

REFERENCE SIGNS LIST

1 DUMP TRUCK
2 VEHICLE BODY
3 TRAVELING DEVICE
4 WHEELS
4F FRONT WHEEL
4R REAR WHEEL
5 TIRE
5F FRONT TIRE
5R REAR TIRE
6 ENGINE
7 HOIST CYLINDER
8 BRACKET
9 ROTATION PIN
10 DUMP BODY
11 FRONT PLATE
12 BOTTOM PLATE
13 SIDE PLATE
13R RIGHT SIDE PLATE
13L LEFT SIDE PLATE
14 PROTECTOR PLATE
21 INLET PORT
22 EXHAUST PORT
23 FLOW PATH
23A FIRST FLOW PATH
23B SECOND FLOW PATH
23C THIRD FLOW PATH
23D FOURTH FLOW PATH
23E FIFTH FLOW PATH
23F SIXTH FLOW PATH
23G SEVENTH FLOW PATH
30 COVER MEMBER
31 UPPER PLATE
32 LOWER PLATE
33 OPPOSING PLATE
34 UPPER SURFACE
34A INNER END PORTION (SECOND INNER END PORTION)
34B OUTER END PORTION (SECOND OUTER END PORTION)
34C REAR END PORTION
35 LOWER SURFACE
35A INNER END PORTION
35B OUTER END PORTION
35C REAR END PORTION
36 GUIDE SURFACE
36A INNER END PORTION (FIRST INNER END PORTION)
36B OUTER END PORTION (FIRST OUTER END PORTION)
36C REAR END PORTION
37 LOWER SURFACE
38 OPPOSING SURFACE
38A FRONT END PORTION (FIRST FRONT END PORTION)
38B REAR END PORTION (FIRST REAR END PORTION)
38C UPPER END PORTION
38D LOWER END PORTION
40 FLOW REGULATION MEMBER
40A INNER END PORTION
40B OUTER END PORTION
41 FLOW REGULATION SURFACE
41A FRONT END PORTION (SECOND FRONT END PORTION)
41B REAR END PORTION (SECOND REAR END PORTION)
41C UPPER END PORTION
41D LOWER END PORTION
42 REAR SURFACE
50 OPENING
FX ROTATION AXIS
RX ROTATION AXIS

The invention claimed is:

1. A dump body comprising:
   a side plate;
   a flow path which is provided in the side plate and through which an exhaust gas of an engine flows;
   an exhaust port for discharging exhaust gas from the flow path which is provided in an outer surface of the side plate; and
   a guide surface which has a first inner end portion and a first outer end portion and is inclined downward toward the first outer end portion, the first inner end portion being connected to an outer surface of the side plate below the exhaust port;
   whereby liquid dripped from the exhaust port to the first inner end portion of the guide surface flows to the first outer end portion while being guided by the guide surface by an action of gravity.

2. The dump body according to claim 1, further comprising
   an opposing surface which has a first front end portion and a first rear end portion and opposes an exhaust port, the first front end portion being connected to an outer surface of the side plate in front of the exhaust port, the first rear end portion being away from the outer surface of the side plate.

3. The dump body according to claim 2, wherein
   the first outer end portion of the guide surface and a lower end portion of the opposing surface are connected to each other.

4. The dump body according to claim 1, further comprising
an upper surface which has a second inner end portion and a second outer end portion and is inclined downward toward the second outer end portion, the second inner end portion being connected to an outer surface of the side plate above the exhaust port.

5. The dump body according to claim 1, further comprising
a flow regulation surface which has a second front end portion and a second rear end portion and is inclined to be away from the outer surface of the side plate toward the second rear end portion, the second front end portion being connected to an outer surface of the side plate at rear of the exhaust port.

6. A dump truck comprising:
the dump body according to claim 1; and
a vehicle body supporting the dump body.

* * * * *